United States Patent
Lu

(10) Patent No.: US 9,864,151 B2
(45) Date of Patent: Jan. 9, 2018

(54) MULTI-FIBER FIBER OPTIC CONNECTOR

(71) Applicant: CommScope Technologies LLC, Hickory, NC (US)

(72) Inventor: Yu Lu, Eden Prairie, MN (US)

(73) Assignee: CommScope Technologies LCC, Hickory, NC (US)

( * ) Notice: Subject to any disclaimer, the term of this patent is extended or adjusted under 35 U.S.C. 154(b) by 0 days.

(21) Appl. No.: 15/209,282

(22) Filed: Jul. 13, 2016

(65) Prior Publication Data

US 2017/0010423 A1  Jan. 12, 2017

Related U.S. Application Data

(60) Continuation of application No. 15/051,295, filed on Feb. 23, 2016, now Pat. No. 9,442,257, which is a (Continued)

(51) Int. Cl.
*G02B 6/38* (2006.01)
*G02B 6/40* (2006.01)
*G02B 6/44* (2006.01)

(52) U.S. Cl.
CPC .......... *G02B 6/3887* (2013.01); *G02B 6/387* (2013.01); *G02B 6/3821* (2013.01); *G02B 6/3825* (2013.01); *G02B 6/3833* (2013.01); *G02B 6/3846* (2013.01); *G02B 6/3885* (2013.01); *G02B 6/3891* (2013.01); (Continued)

(58) Field of Classification Search
None
See application file for complete search history.

(56) References Cited

U.S. PATENT DOCUMENTS 2,027,962 A  1/1936  Currie
3,086,242 A  4/1963  Cook et al.
(Continued)

FOREIGN PATENT DOCUMENTS

CA  2 354 718 A1  3/2002
CN  101846776 A  9/2010
(Continued)

OTHER PUBLICATIONS

"Considerations for Optical Fiber Termination," AEN 89, Revision 3, Corning Cable Systems LLC, pp. 1-7 (Copyright 2008).
(Continued)

*Primary Examiner* — Jerry Rahll
(74) *Attorney, Agent, or Firm* — Merchant & Gould P.C.

(57) ABSTRACT

A fiber optic cable assembly includes a fiber optic cable and a fiber optic connector. The cable includes a jacket having an elongated transverse cross-sectional profile that defines a major axis and a minor axis. Strength components of the cable are anchored to the connector. The fiber optic connector includes a multi-fiber ferrule defining a major axis that is generally perpendicular to the major axis of the jacket and a minor axis that is generally perpendicular to the minor axis of the jacket. Certain types of connectors include a connector body defining a side opening that extends along a length of the connector body; a multi-fiber ferrule configured for lateral insertion into the connector body through the side opening; and a cover that mounts over the side opening after the multi-fiber ferrule has been inserted into the connector body through the side opening.

18 Claims, 13 Drawing Sheets

Related U.S. Application Data division of application No. 14/360,383, filed as application No. PCT/US2012/062526 on Oct. 30, 2012, now Pat. No. 9,304,262.

(60) Provisional application No. 61/563,275, filed on Nov. 23, 2011.

(52) U.S. Cl.
CPC ........... *G02B 6/3894* (2013.01); *G02B 6/406* (2013.01); *G02B 6/4429* (2013.01); *G02B 6/3869* (2013.01); *G02B 6/4403* (2013.01)

(56) References Cited

U.S. PATENT DOCUMENTS

| | | |
|---|---|---|
| 3,597,372 A | 8/1971 | Cook |
| 3,777,048 A | 12/1973 | Traut |
| 4,220,394 A | 9/1980 | Tardy |
| 4,389,428 A | 6/1983 | McDuffee et al. |
| 4,410,469 A | 10/1983 | Katagiri et al. |
| 4,410,561 A | 10/1983 | Hart, Jr. |
| 4,598,974 A | 7/1986 | Munn et al. |
| 4,662,307 A | 5/1987 | Amos et al. |
| 4,711,752 A | 12/1987 | Deacon et al. |
| 4,798,431 A | 1/1989 | Clark et al. |
| 4,877,303 A | 10/1989 | Caldwell et al. |
| 4,877,306 A | 10/1989 | Kar |
| 4,902,095 A | 2/1990 | Baker et al. |
| 4,920,366 A | 4/1990 | Bowen et al. |
| 4,964,688 A | 10/1990 | Caldwell et al. |
| 5,022,735 A | 6/1991 | Dahlgren |
| 5,034,170 A | 7/1991 | Briggs, Jr. et al. |
| 5,040,867 A | 8/1991 | de Jong et al. |
| 5,042,901 A | 8/1991 | Merriken et al. |
| 5,046,813 A | 9/1991 | Itoh et al. |
| 5,093,048 A | 3/1992 | Kagan |
| 5,127,820 A | 7/1992 | Briggs, Jr. et al. |
| 5,222,171 A | 6/1993 | Straus |
| 5,241,613 A | 8/1993 | Li et al. |
| 5,263,105 A | 11/1993 | Johnson et al. |
| 5,309,536 A | 5/1994 | Suganuma et al. |
| 5,317,663 A | 5/1994 | Beard et al. |
| 5,367,594 A | 11/1994 | Essert et al. |
| 5,375,183 A | 12/1994 | Edwards et al. |
| 5,465,313 A | 11/1995 | Belenkiy et al. |
| 5,495,545 A | 2/1996 | Cina et al. |
| 5,582,671 A | 12/1996 | Harman et al. |
| 5,677,976 A | 10/1997 | Takahashi |
| 5,748,819 A | 5/1998 | Szentesi et al. |
| 5,815,619 A | 9/1998 | Bloom |
| 5,832,162 A | 11/1998 | Sarbell |
| 5,909,528 A | 6/1999 | Tamekuni et al. |
| 5,963,692 A | 10/1999 | Marazzi et al. |
| 5,963,698 A | 10/1999 | Brugger et al. |
| 6,068,410 A | 5/2000 | Giebel et al. |
| 6,085,003 A | 7/2000 | Knight |
| 6,120,193 A | 9/2000 | Luther et al. |
| 6,152,609 A | 11/2000 | Dzyck et al. |
| 6,173,097 B1 | 1/2001 | Throckmorton et al. |
| 6,179,482 B1 | 1/2001 | Takizawa et al. |
| 6,186,672 B1 | 2/2001 | Takizawa et al. |
| 6,247,850 B1 | 6/2001 | Edwards et al. |
| 6,340,249 B1 | 1/2002 | Hayes et al. |
| 6,419,810 B1 | 7/2002 | Tanaka et al. |
| 6,439,780 B1 | 8/2002 | Mudd et al. |
| 6,498,888 B1 | 12/2002 | Chenard et al. |
| 6,503,422 B2 | 1/2003 | Chudoba et al. |
| 6,520,689 B2 | 2/2003 | DeMartino et al. |
| 6,532,327 B1 | 3/2003 | Gatica et al. |
| 6,550,279 B1 | 4/2003 | Anderson et al. |
| 6,648,520 B2 | 11/2003 | McDonald et al. |
| 6,715,933 B1 | 4/2004 | Zimmer et al. |
| 6,719,927 B2 | 4/2004 | Sakurai et al. |
| 6,726,370 B2 | 4/2004 | Shimotsu |
| 6,728,452 B2 | 4/2004 | Nishimura |
| 6,738,552 B2 | 5/2004 | Hirsch |
| 6,742,936 B1 | 6/2004 | Knecht et al. |
| 6,811,323 B2 | 11/2004 | Murray et al. |
| 6,827,508 B2 | 12/2004 | Stowe |
| 6,840,687 B2 | 1/2005 | Riis et al. |
| 6,856,748 B1 | 2/2005 | Elkins, II et al. |
| 6,908,236 B2 | 6/2005 | Oishi et al. |
| 6,918,703 B2 | 7/2005 | Chen et al. |
| 6,962,446 B2 | 11/2005 | Greub et al. |
| 6,964,578 B2 | 11/2005 | Clark et al. |
| 6,979,133 B2 | 12/2005 | Montena |
| 7,016,592 B2 | 3/2006 | Elkins, II et al. |
| 7,088,893 B2 | 8/2006 | Cooke et al. |
| 7,090,406 B2 | 8/2006 | Melton et al. |
| 7,104,702 B2 | 9/2006 | Barnes et al. |
| 7,140,786 B2 | 11/2006 | Takayanagi et al. |
| 7,216,512 B2 | 5/2007 | Danley et al. |
| 7,220,061 B2 | 5/2007 | De Marchi |
| 7,264,402 B2 | 9/2007 | Theuerkorn et al. |
| 7,264,410 B1 | 9/2007 | Doss et al. |
| 7,298,941 B2 | 11/2007 | Palen et al. |
| 7,329,049 B2 | 2/2008 | Meek et al. |
| 7,507,031 B2 | 3/2009 | Kawasaki |
| 7,572,065 B2 | 8/2009 | Lu et al. |
| 7,594,764 B2 | 9/2009 | Palmer et al. |
| 7,628,549 B2 | 12/2009 | Takahashi et al. |
| 7,708,476 B2 | 5/2010 | Liu |
| 7,744,286 B2 | 6/2010 | Lu et al. |
| 7,744,288 B2 | 6/2010 | Lu et al. |
| 7,756,370 B2 | 7/2010 | Hayasaka |
| 7,762,726 B2 | 7/2010 | Lu et al. |
| 7,764,402 B2 | 7/2010 | Kakutani et al. |
| 7,860,363 B2 | 12/2010 | Kawasaki |
| 7,942,590 B2 | 5/2011 | Lu et al. |
| 8,041,166 B2 | 10/2011 | Kachmar |
| 8,043,013 B2 | 10/2011 | Lichoulas et al. |
| 8,939,654 B2 | 1/2015 | Lu et al. |
| 9,016,953 B2 | 4/2015 | Ott et al. |
| 2001/0017963 A1 | 8/2001 | Shimotsu |
| 2002/0044749 A1 | 4/2002 | Koike et al. |
| 2002/0131720 A1 | 9/2002 | Chudoba et al. |
| 2002/0146214 A1 | 10/2002 | Tanaka et al. |
| 2003/0044143 A1 | 3/2003 | Trentelman et al. |
| 2004/0047566 A1 | 3/2004 | McDonald et al. |
| 2004/0062480 A1 | 4/2004 | Cronk et al. |
| 2004/0151437 A1 | 8/2004 | Marrs et al. |
| 2005/0042387 A1 | 2/2005 | Dower |
| 2005/0175308 A1 | 8/2005 | Elkins, II et al. |
| 2005/0213891 A1 | 9/2005 | Hardcastle et al. |
| 2005/0238292 A1 | 10/2005 | Barnes et al. |
| 2005/0276549 A1 | 12/2005 | Tabata et al. |
| 2006/0002662 A1 | 1/2006 | Manning et al. |
| 2006/0103039 A1 | 5/2006 | Shields et al. |
| 2006/0233506 A1 | 10/2006 | Noonan et al. |
| 2007/0110371 A1 | 5/2007 | Zimmel et al. |
| 2007/0274657 A1 | 11/2007 | Billman et al. |
| 2008/0069500 A1 | 3/2008 | Harness et al. |
| 2008/0095504 A1 | 4/2008 | Kawasaki |
| 2008/0131056 A1 | 6/2008 | Isenhour et al. |
| 2008/0193089 A1 | 8/2008 | Miyamoto et al. |
| 2008/0219624 A1 | 9/2008 | Pimpinella et al. |
| 2009/0162019 A1 | 6/2009 | Lichoulas et al. |
| 2010/0124394 A1 | 5/2010 | Meek et al. |
| 2010/0129031 A1 | 5/2010 | Danley et al. |
| 2010/0266242 A1 | 10/2010 | Lu et al. |
| 2010/0266244 A1 | 10/2010 | Lu et al. |
| 2010/0272397 A1 | 10/2010 | Komaki et al. |
| 2010/0284653 A1 | 11/2010 | Tamekuni et al. |
| 2010/0290741 A1 | 11/2010 | Lu et al. |
| 2010/0303425 A1 | 12/2010 | Liu |
| 2010/0322568 A1 | 12/2010 | Zimmel et al. |
| 2011/0002586 A1 | 1/2011 | Nhep |
| 2011/0097432 A1 | 4/2011 | Yu et al. |
| 2011/0103753 A1 | 5/2011 | Wouters |
| 2011/0173817 A1 | 7/2011 | Barnes et al. |
| 2011/0176774 A1 | 7/2011 | Barnes et al. |
| 2011/0176780 A1 | 7/2011 | Barnes et al. |
| 2011/0188813 A1 | 8/2011 | Marcouiller et al. |

(56) References Cited

U.S. PATENT DOCUMENTS

| | | |
|---|---|---|
| 2011/0226019 A1 | 9/2011 | Huang et al. |
| 2011/0280525 A1 | 11/2011 | Marcouiller et al. |
| 2012/0177328 A1 | 7/2012 | Marcouiller et al. |
| 2012/0219258 A1 | 8/2012 | Grandidge et al. |
| 2012/0243832 A1 | 9/2012 | Tamekuni et al. |
| 2012/0288238 A1 | 11/2012 | Park et al. |
| 2013/0008594 A1 | 1/2013 | Takeuchi et al. |
| 2013/0136857 A1 | 5/2013 | Blanchetiere et al. |
| 2014/0064665 A1 | 3/2014 | Ott et al. |
| 2014/0086534 A1 | 3/2014 | Lu et al. |

FOREIGN PATENT DOCUMENTS

| | | |
|---|---|---|
| DE | 195 17 750 A1 | 11/1996 |
| EP | 0 125 398 A1 | 11/1984 |
| EP | 1 122 564 A2 | 8/2001 |
| GB | 2 148 537 A | 5/1985 |
| JP | 61-9612 | 1/1986 |
| JP | 7-234344 | 9/1995 |
| JP | 8-234042 | 9/1996 |
| JP | 8-262271 | 10/1996 |
| JP | 11-287929 | 10/1999 |
| JP | 2002-82257 | 3/2002 |
| JP | 2008-116840 | 5/2008 |
| JP | 2011-95410 | 5/2011 |
| KR | 10-1038195 B1 | 6/2011 |
| TW | 571134 | 1/2004 |
| TW | 592934 | 6/2004 |
| WO | 01/27673 | 4/2001 |
| WO | 03/050579 A2 | 6/2003 |
| WO | 2004/028993 A1 | 4/2004 |
| WO | 2006/032153 A1 | 3/2006 |
| WO | 2009/011799 A1 | 1/2009 |
| WO | 2010/090211 A1 | 8/2010 |
| WO | 2011/087941 A1 | 7/2011 |
| WO | 2011/087942 A1 | 7/2011 |
| WO | 2011/087944 A1 | 7/2011 |
| WO | 2012/005407 A1 | 1/2012 |

OTHER PUBLICATIONS

FuseConnect™ Fusion Spliced Field-terminated SC Connector, AFL Telecommunications, 6 pages (Copyright 2007).

Abe, K. et al., "Modal interference in a short fiber section: fiber length, splice loss, cutoff, and wavelength dependences," *Optical Fiber Communication Conference*, p. 139, No. ThA3 (Feb. 1991).

De Jong, M., "Cleave and crimp fiber optic connector for field installation," *Optical Fiber Communication Conference, 1990 Technical Digest Series*, vol. 1, Conference Edition, 3 pages (Jan. 1990).

Duff, D.G. et al., "Measurements of modal noise in single-mode lightwave systems," *Conference on Optical Fiber Communication*, Paper No. TU01, 5 pages (Feb. 1985).

European Search Report for Application No. 12851590.5 mailed Apr. 30, 2015.

FuseConnect™ ST Installation & Assembly Instructions, 14 pages (Mar. 2, 2011).

Goodwin, J.C. et al., "Modal Noise in Short Fiber Sections," *Journal of Lightwave Technology*, vol. 9, No. 8, pp. 954-958 (Aug. 1991).

Harris, D. et al., "Azimuthal Dependence of Modal Interference in Closely Spaced Single-Mode Fiber Joints," *IEEE Photonics Technology Letters*, vol. 6, No. 10, pp. 1235-1237 (Oct. 1994).

Harris, D.O. et al., "Characterizing Modal Interference in Field Installable Single-Mode Fiber Connectors Incorporating Short Fiber Stubs," *Technical Digest—Symposium on Optical Fiber Measurements*, NIST Special Publication 864, pp. 35-38 (Sep. 1994).

Heckmann, S., "Modal noise in single-mode fibres operated slightly above cutoff," *Electronics Letters*, vol. 17, No. 14, pp. 499-500 (Jul. 1981).

International Search Report and Written Opinion for PCT/US2012/062526 mailed Mar. 25, 2013 (11 pages).

Li, M-J. et al., "Optical Fiber Design for Field Mountable Connectors," *Journal of Lightwave Technology*, vol. 18, No. 3, pp. 314-319 (Mar. 2000).

Lynx2 CustomFit® MPO Splice-On Connector, http://www.sumitoelectric.com/products/fusionsplicers/lynx_mpo/, 2 pages (Copyright 2011).

Office Action of Chinese Patent Application No. 201280064226.7 mailed Apr. 30, 2015, with English Translation, 11 pp.

Ohzawa, K. et al., "Development of new optical fiber fusion splicer for factory use," *International Wire & Cable Symposium Proceedings*, pp. 644-649 (1999).

Olson, G. et al., "Modal Noise in Single-Mode Fiber-Optic Systems with Closely Spaced Splices," *Fiber and Integrated Optics*, vol. 9, pp. 237-244 (1990).

Throckmorton, R. et al., "Modal Interference in Field Installable Single-Mode Fiber-Optic Connectors," *Proc. 10th National Fiber Optic Engineers Conference*, vol. 3, pp. 399-406 (1994).

Yablon, Andrew D., "Optical Fusion Splicing" Section 6.6.1; 5 pp.

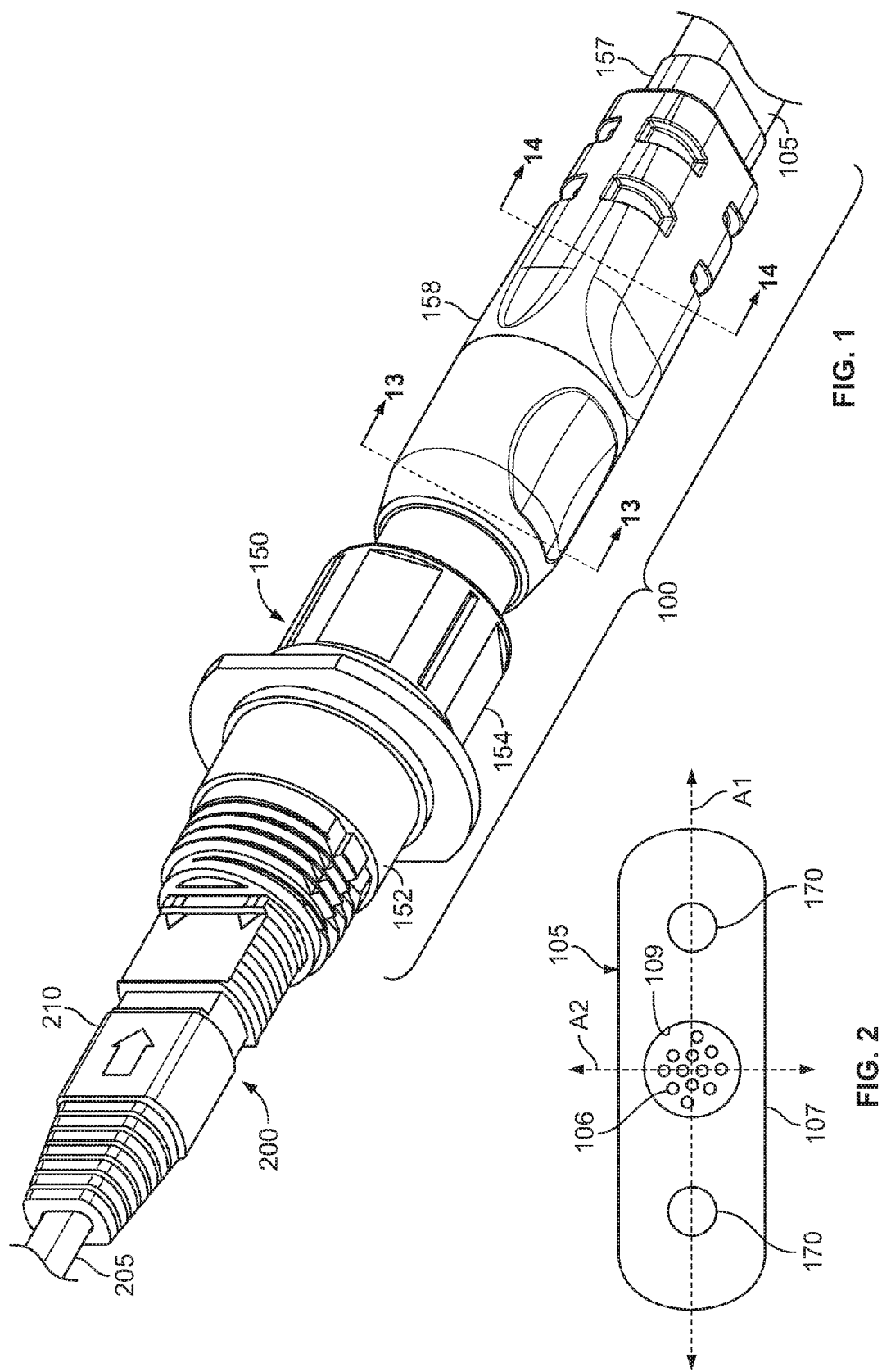

MULTI-FIBER FIBER OPTIC CONNECTOR

CROSS REFERENCE TO RELATED APPLICATIONS

This application is a continuation of U.S. patent application Ser. No. 15/051,295, filed 23 Feb. 2016, now issued as U.S. Pat. No. 9,442,257 on 13 Sep. 2016, which is a divisional of U.S. patent application Ser. No. 14/360,383, filed 23 May 2014 and issued on 5 Apr. 2016 as U.S. Pat. No. 9,304,262, which is a US National Stage of PCT International Patent application No. PCT/US2012/062526, filed 30 Oct. 2012, which claims benefit of U.S. Patent Application No. 61/563,275, filed on 23 Nov. 2011 and which applications are incorporated herein by reference. To the extent appropriate, a claim of priority is made to each of the above disclosed applications.

TECHNICAL FIELD

The present disclosure relates generally to optical fiber communication systems. More particularly, the present disclosure relates to fiber optic connectors used in optical fiber communication systems.

BACKGROUND

Fiber optic communication systems are becoming prevalent in part because service providers want to deliver high bandwidth communication capabilities (e.g., data and voice) to customers. Fiber optic communication systems employ a network of fiber optic cables to transmit large volumes of data and voice signals over relatively long distances. Optical fiber connectors are an important part of most fiber optic communication systems. Fiber optic connectors allow two optical fibers to be quickly optically connected without requiring a splice. Fiber optic connectors can be used to optically interconnect two lengths of optical fiber. Fiber optic connectors can also be used to interconnect lengths of optical fiber to passive and active equipment.

A typical fiber optic connector includes a ferrule assembly supported at a distal end of a connector housing. A spring is used to bias the ferrule assembly in a distal direction relative to the connector housing. The ferrule functions to support an end portion of at least one optical fiber (in the case of a multi-fiber ferrule, the ends of multiple fibers are supported). The ferrule has a distal end face at which a polished end of the optical fiber is located. When two fiber optic connectors are interconnected, the distal end faces of the ferrules abut one another and the ferrules are forced proximally relative to their respective connector housings against the bias of their respective springs. With the fiber optic connectors connected, their respected optical fibers are coaxially aligned such that the end faces of the optical fibers directly oppose one another. In this way, an optical signal can be transmitted from optical fiber to optical fiber through the aligned end faces of the optical fibers. For many fiber optic connector styles, alignment between two fiber optic connectors is provided through the use of an intermediate fiber optic adapter.

A number of fiber optic connection systems have been developed for use in outside environments. Such connection systems typically have a ruggedized/hardened construction adapted for accommodating substantial pull-out forces. Such connection systems are also typically sealed to limit moisture intrusion. Example fiber optic connection systems adapted for outside use are disclosed in U.S. Pat. Nos. 6,648,520, 7,264,402, 7,572,065, 7,744,288, 7,762,726, 7,744,286, 7,942,590.

Multi-fiber connectors can include splice-on configurations and direct termination configurations. For a splice-on configuration, optical fibers are pre-terminated within a multi-fiber ferrule and the end face of the ferrule is processed (e.g., polished and shaped as needed). After processing of the ferrule, the optical fibers have polished end faces at a front of the ferrule and also have pigtails that project rearwardly from the ferrule. In use, the multi-fiber ferrule is loaded into a connector and the pigtails are spliced to optical fibers corresponding to a fiber optic cable desired to be coupled to the connector. Typically, the splice location is positioned rearward of the connector (e.g., see U.S. patent application Ser. No. 13/106,371, filed May 12, 2011; and titled "Splice Enclosure Arrangement for Fiber Optic Cables," U.S. provisional patent application Ser. No. 61/421,314, filed Dec. 9, 2010, and titled "Splice Enclosure Arrangement for Fiber Optic Cables." In a direct termination configuration, the optical fibers of a fiber optic cable are terminated directly in a multi-fiber ferrule of a multi-fiber connector without using any intermediate splice. What is needed is a multi-fiber connector that can readily accommodate splice-on and direct termination configurations. What is also needed is a hardened multi-fiber connector that can readily accommodate splice-on and direct termination configurations.

SUMMARY

One aspect of the present disclosure relates to a multi-fiber connector that accommodates both spliced-on and direct termination configurations. For direct termination configurations, a ferrule can be mounted directly at ends of the optical fibers of the cable, the ferrule end face can be processed (e.g., polished, shaped, etc.) and then the cable and ferrule assembly can be loaded into the connector body. For splice-on configurations, optical fibers are pre-installed in the ferrule and the ferrule is processed. Thereafter, the pigtails of the optical fibers are spliced to the fibers of an optical cable and then the assembly is loaded into the connector body.

Certain example types of fiber optic cable assemblies include a fiber optic cable and a fiber optic connector. The fiber optic cable includes a jacket having an elongated transverse cross-sectional profile that defines a major axis and a minor axis. The major and minor axes of the jacket are generally perpendicular relative to one another. The fiber optic cable also includes optical fibers contained within the jacket. The fiber optic cable also includes first and second strength components positioned on opposite sides of the optical fibers. The first and second strength components are anchored relative to the fiber optic connector, which includes a connector body in which a multi-fiber ferrule is mounted. The multi-fiber ferrule defines a major axis and a minor axis. The major and minor axes of the multi-fiber ferrule axis are generally perpendicular relative to one another. The major axis of the multi-fiber ferrule is generally perpendicular to the major axis of the jacket and the minor axis of the multi-fiber ferrule is generally perpendicular to the minor axis of the jacket. During assembly, the multi-fiber ferrule can be side loaded into the fiber optic connector.

Certain example types of fiber optic connectors include a connector body, a multi-fiber ferrule that mounts at a front end of the connector body, and a cover. The connector body has a length that extends along an axis of the connector body.

The connector body includes front and rear ends separated by the length of the connector body. The connector body also defines a side opening that extends along the length of the connector body. The side opening is arranged and configured for allowing the multi-fiber ferrule to be inserted laterally into the connector body through the side opening. The cover mounts over the side opening after the multi-fiber ferrule has been inserted into the connector body through the side opening.

BRIEF DESCRIPTION OF THE DRAWINGS

FIG. 1 is a perspective view of a first example hardened multi-fiber cable assembly in accordance with the principles of the present disclosure, and adapter is shown coupling the first cable assembly to a second example cable assembly terminated by a multi-fiber connector;

FIG. 2 is a cross-sectional view of an example fiber optic cable having a major axis and a minor axis;

DETAILED DESCRIPTION

Figure 3:
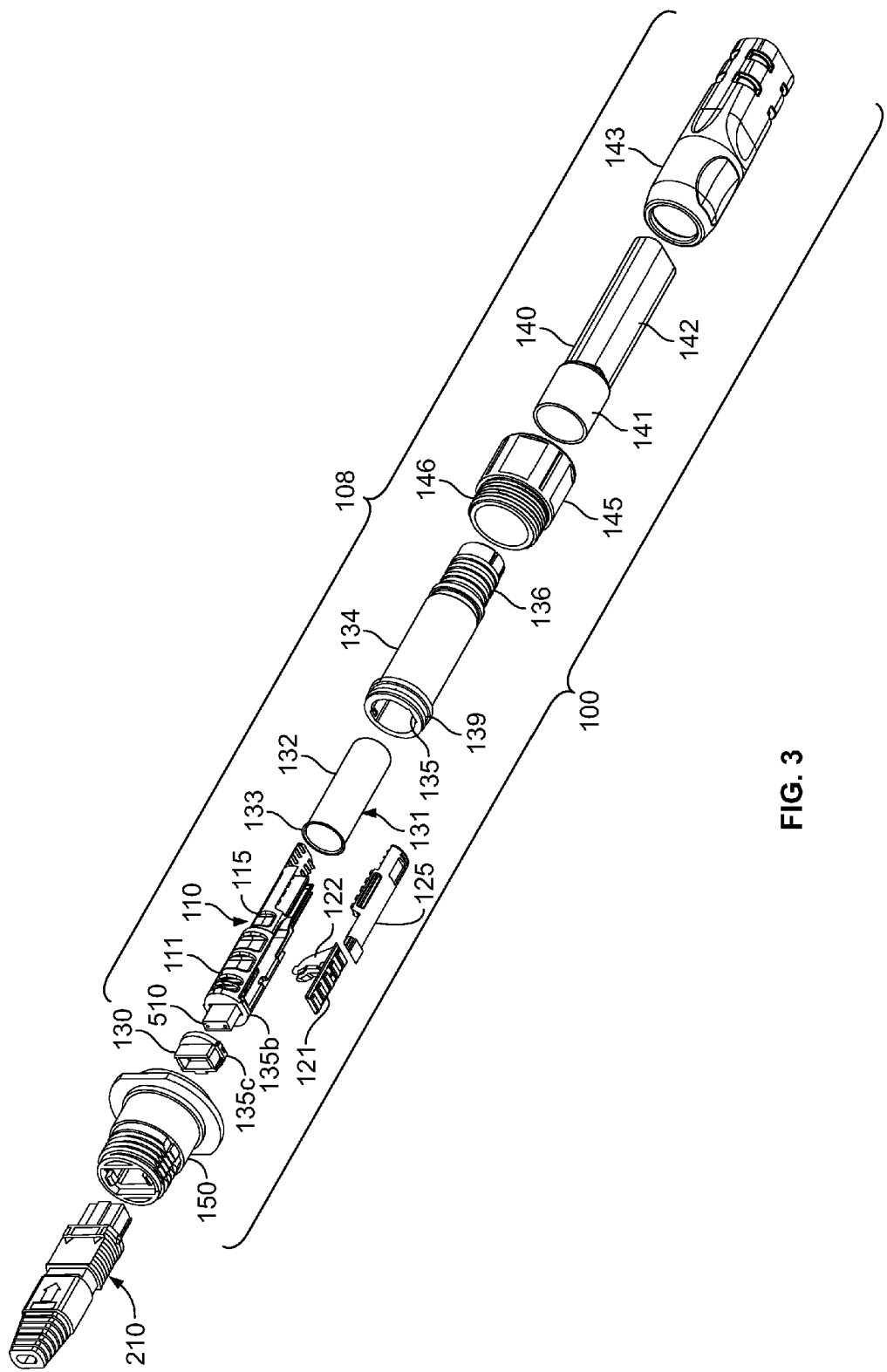
FIG. 3 is an exploded view of the components of the first and second cable assemblies shown in FIG. 1.

Some aspects of this disclosure are directed to certain types of fiber optic cable assemblies 100 including a fiber optic cable 105 terminated by a fiber optic connector 110 (FIG. 3). In accordance with some aspects, the fiber optic connector 110 may be part of a hardened (i.e., environmentally sealed) fiber optic connector arrangement 108. In some implementations, the fiber optic connector arrangement 108 is configured to interface with a second fiber optic cable assembly 200. In the example shown, the second fiber optic cable assembly 200 includes a multi-fiber connector 210 terminating a second fiber optic cable 205.

In other implementations, the fiber optic connector arrangement 108 is configured to couple to a fiber optic adapter 150 to enable connection to the fiber optic connector 210 of the second fiber optic cable assembly 200. For example, in FIG. 1, the example adapter 150 enables a first fiber optic connector 110, which terminates a first optical cable 105, to mate with a second optic connector 210, which terminates a second optical cable 205. The adapter 150 defines a socket configured to receive a connectorized end of the second cable assembly 200. In some implementations, the fiber optic adapter 150 is configured to mount within an opening defined in a wall, plate, enclosure, or other structure.

In some implementations, the fiber optic connector arrangement 108 is a hardened (i.e., environmentally sealed) fiber optic connector arrangement 108. In some implementations, the adapter 150 is a hardened (i.e., environmentally sealed) adapter. In certain implementations, the adapter 150 enables the hardened fiber optic connector arrangement 108 to mate with a non-hardened (i.e., unsealed) fiber optic connector 210. For example, in FIG. 1, the adapter 150 coupled to the hardened fiber optic connector arrangement 108 is configured to receive a non-hardened fiber optic connector 210 (e.g., an MPO connector). Certain types of hardened fiber optic connector arrangements 108 are configured to mate with other hardened fiber optic connector arrangements (e.g., in a plug and receptacle style connection).

FIG. 2 shows one example fiber optic cable 105 including one or more optical fibers 106 surrounded by an outer jacket 107. The outer jacket 107 has an elongated transverse cross-sectional profile defining a major axis A1 and a minor axis A2. In the example shown, the transverse cross-sectional profile defined by the outer jacket 107 is generally rectangular with rounded ends. The major axis A1 and the minor axis A2 intersect perpendicularly at a lengthwise axis of the cable 105. The transverse cross-sectional profile has maximum width that extends along the major axis A1 and a maximum thickness that extends along the minor axis A2. The maximum width of the transverse cross-sectional profile is longer than the maximum thickness of the transverse cross-sectional profile. In one example implementation, the fiber optic cable 105 is a flat drop cable.

In some implementations, the first and second optical cables 105, 205 include multiple optical fibers. In such implementations, the fiber optic connectors 110, 210 are configured to terminate multiple fibers. In other implementations, one or both of the optical cables 105, 205 include only a single optical fiber. In some implementations, the outer jacket 107 also defines a first passage 109 that extends through the outer jacket 107 along a lengthwise axis of the outer jacket 107. In certain implementations, the optical fibers 106 are disposed loose in the first passage 109. In other implementations, the optical fibers 106 may be ribbonized, buffered, or otherwise contained within the passage 109. In the example shown, the fiber optic cable 105 includes twelve optical fibers 106. In other implementations, however, the fiber optic cable 105 may include a greater or lesser number of optical fibers 106 (e.g., one fiber, two fibers, six fibers, ten fibers, fifteen fibers, twenty-four fibers, etc.).

At least one strength component 170 also extends through the outer jacket 107 along a lengthwise axis of the outer jacket 107. In the example shown, first and second strength components 170 are disposed on opposite sides of the first passage 109 along the major axis A1. In other implementations, example fiber optic cables 105 may include a single strength component 170. In still other implementations, example fiber optic cables 105 may include additional strength components 170. In certain embodiments, each strength components 108 is formed by a layer of reinforcing elements (e.g., fibers or yarns such as aramid fibers or yarns) embedded or otherwise integrated within a binder to form a reinforcing structure. In still other embodiments, each strength component 170 can have a glass reinforced polymer (GRP) construction. In some implementations, the strength component 170 has a round cross-sectional profile. In other implementations, the cross-sectional profile of the strength component 170 may be any desired shape (e.g., rectangular, oblong, obround, etc.). Other example cable configurations are disclosed in U.S. Pat. No. 8,041,166, the disclosure of which is hereby incorporated herein by reference.

Figure 15:
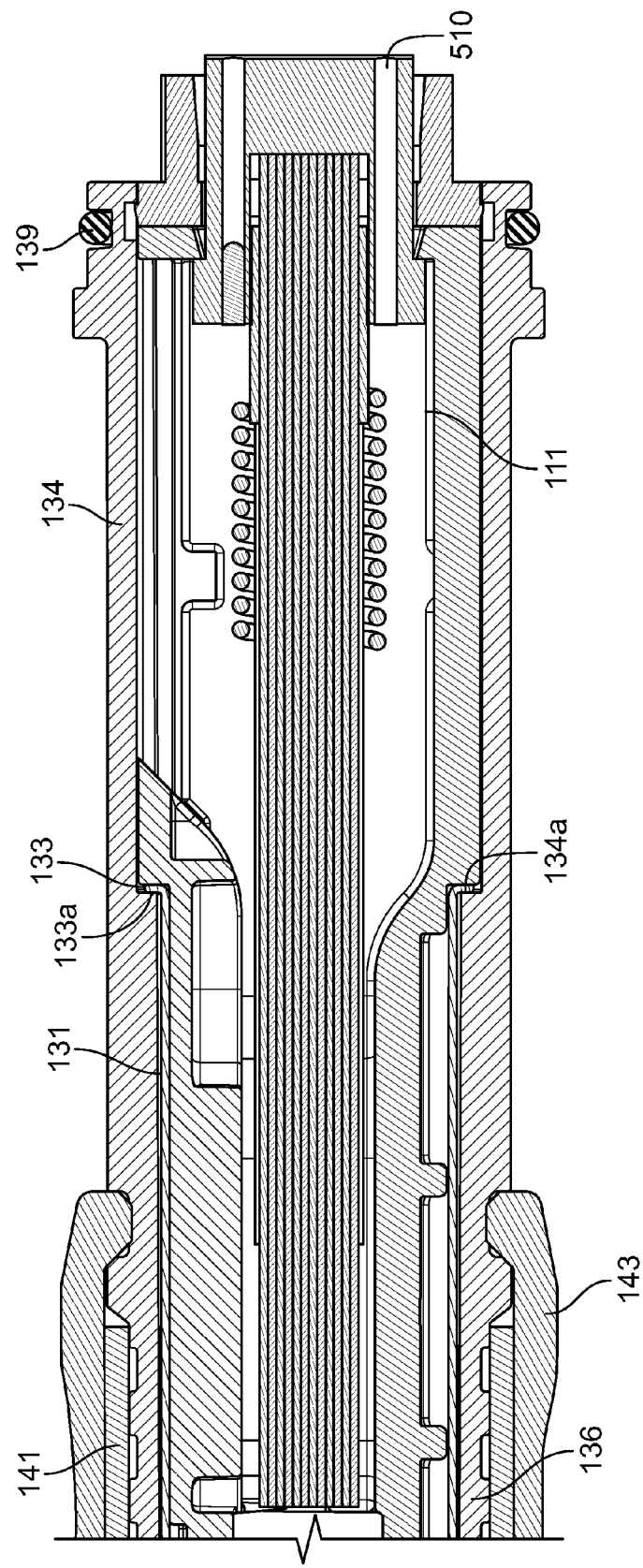
FIG. 15 is an axial cross-sectional view of the example hardened connector arrangement of FIG. 3 shown assembled and with a rear portion of the cable fibers and the strength components removed from view.

FIG. 3 shows an exploded view of the example fiber optic connector arrangement 108 of FIG. 1. The example fiber optic connector arrangement 108 includes a fiber optic connector 110 having a body 111 and a spring-biased ferrule 510. A metal reinforcing sleeve 131 mounts over a rear portion 115 of the connector body 111. The metal reinforcing sleeve 131 includes a main sleeve body 132 and a lip 133 that projects radially outwardly from the main sleeve body 132. The lip 133 has a rearwardly facing surface 133a (FIG. 15).

Figure 12:
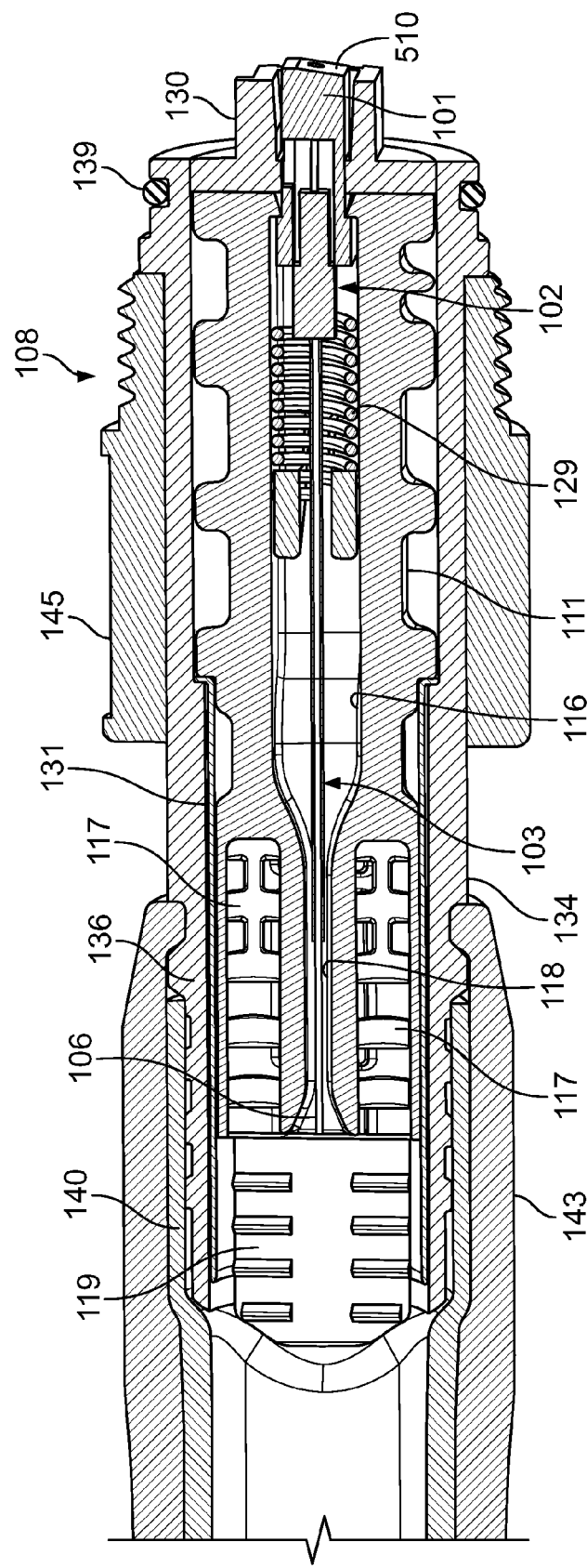
FIG. 12 is an enlarged, cross-sectional view of the example hardened connector arrangement of FIG. 3 shown assembled and with a rear portion of the cable fibers and the strength components removed from view.

An outermost sleeve 134 mounts over the metal reinforcing sleeve 131. The outermost sleeve 134 includes an internal shoulder having a forwardly facing surface 134a (FIG. 15) that abuts the rearwardly facing surface 133a of the lip 133 to limit rearward movement of the reinforcing sleeve 131 relative to the outermost sleeve 134 (see FIG. 15). In certain implementations, the outermost sleeve 134 defines keying features 135 that mate with corresponding keying features 135b of the connector body 111 to ensure proper rotational alignment before the parts when the parts are assembled together. The connector body 111 and the outermost sleeve 134 have a molded plastic construction. An external seal (e.g., an O-ring) 139 mounts about the outermost sleeve 134 (see FIGS. 8, 9, and 12). The seal 139 provides protection against water, dust, or other contaminants when the hardened connector arrangement 108 is mated with another component.

A front end piece 130 mounts at the front end 112 of the connector body 111 and connects to the outermost sleeve 134 such that the outermost sleeve 134 and the front end piece 130 are secured in place relative to the connector body 111 (i.e., the connector body 111 is captured between the pieces). In certain implementations, the front end piece 130 snap-fits to the outermost sleeve 134. In other implementations, the front end piece 130 otherwise couples to the outermost sleeve 134. Keying features 135c of the front end piece 130 may align with keying features 135a of the outermost sleeve 134 to ensure rotational alignment thereinbetween. The front end piece 130 defines a through-opening through which a ferrule 510 of the connector 110 passes.

Figure 14:
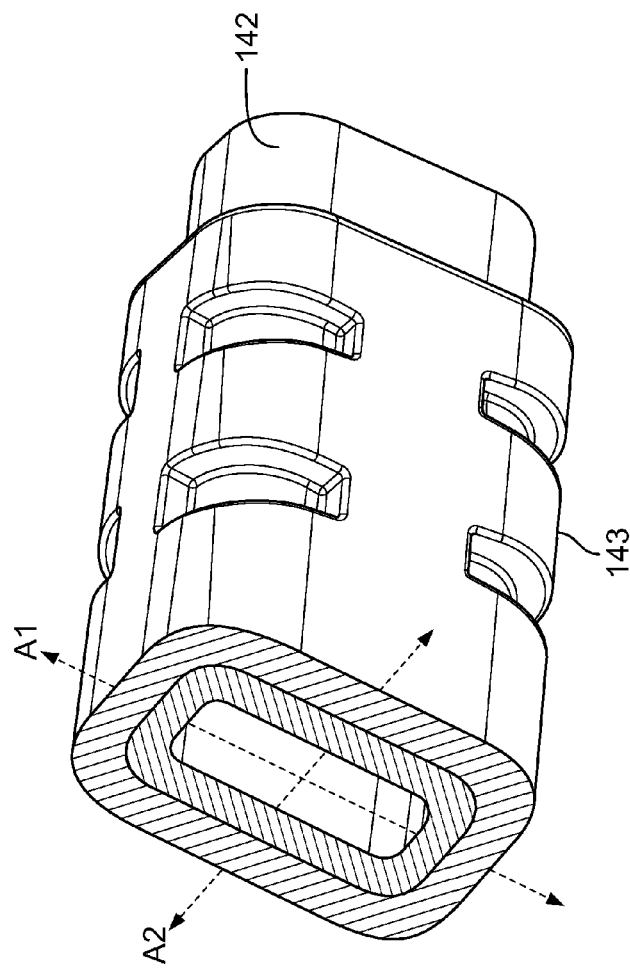
FIG. 14 is a perspective view of a lateral cross-section of the example hardened connector arrangement of FIG. 1 taken along the 14-14 line of FIG. 1.

A shrink tube 140 (e.g., a shrink fit tube having a heat recoverable layer surrounding an adhesive layer as disclosed in U.S. Pat. No. 5,470,622, the disclosure of which is hereby incorporated by reference herein) and a strain-relief boot 143 protect the optical fibers 106 of the cable 105 as the cable exits the connector arrangement 108. The shrink tube 140 has a forward section 141 that is configured to adherently attach over a rearward section 136 of the outmost sleeve 134 and a rearward section 142 that is configured to adherently attach over the cable 105 when installed. The tube 140 mechanically couples the cable jacket 107 to the sleeve 134 and seals the interface between the cable 105 and the sleeve 134. The strain-relief boot 143 mounts coaxially over the shrink tube 140. The boot 143 and tube 140 are shaped and configured to receive the transverse cross-sectional profile of the cable 105 (see FIG. 14).

A fastener 145 mounts over the outermost sleeve 134 for securing the fiber optic connector 110 to a component. In certain implementations, the fastener 145 includes a threaded nut. In some implementations, the fastener 145 secures the connector 110 to another fiber optic connector (e.g., a hardened fiber optic connector). In other implementations, the fastener 145 secures the connector 110 to the fiber optic adapter 150. For example, outer threaded region 146 of the fastener 145 may screw into inner threads of adapter 150.

Figure 4:
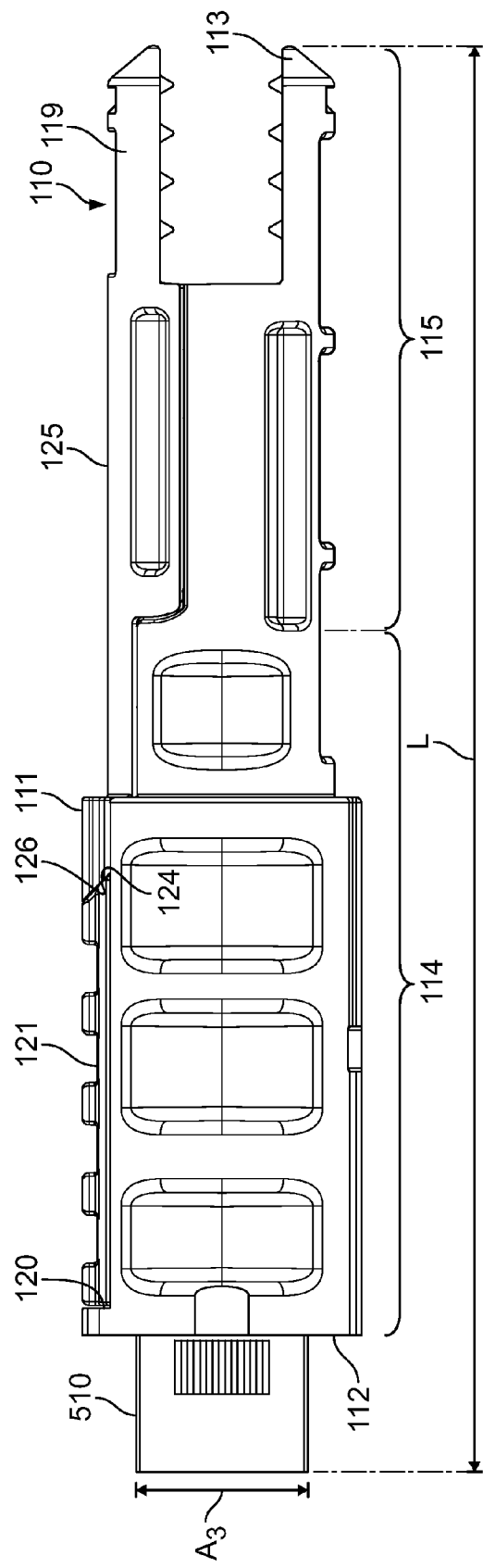
FIG. 4 is a top plan view of an example connector including a connector body, a spring-biased multi-fiber ferrule, and a cover.
Figure 5:
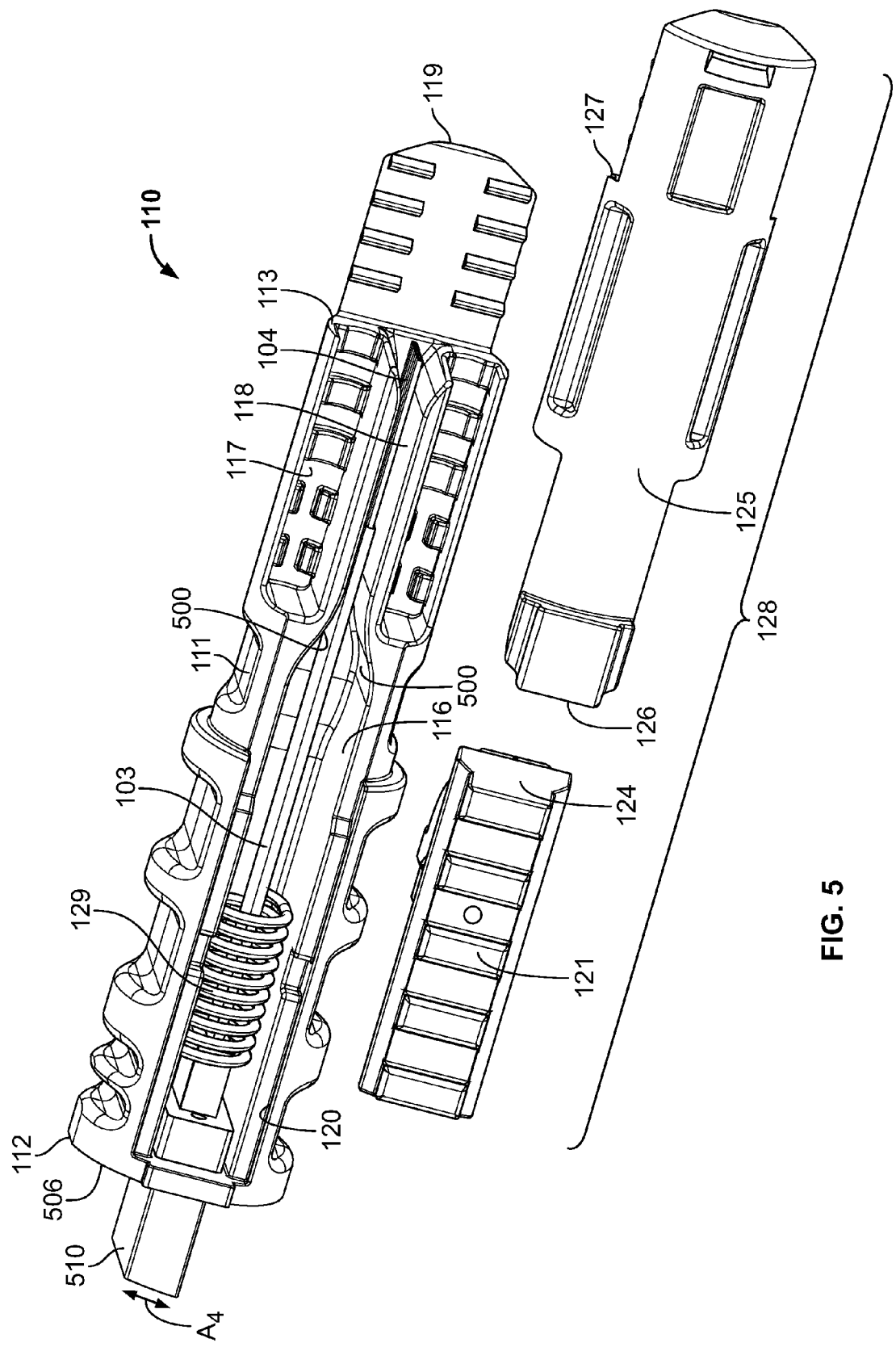
FIG. 5 is a perspective view of the example connector of FIG. 4 shows in the cover exploded from a side opening in the connector body.
Figure 6:
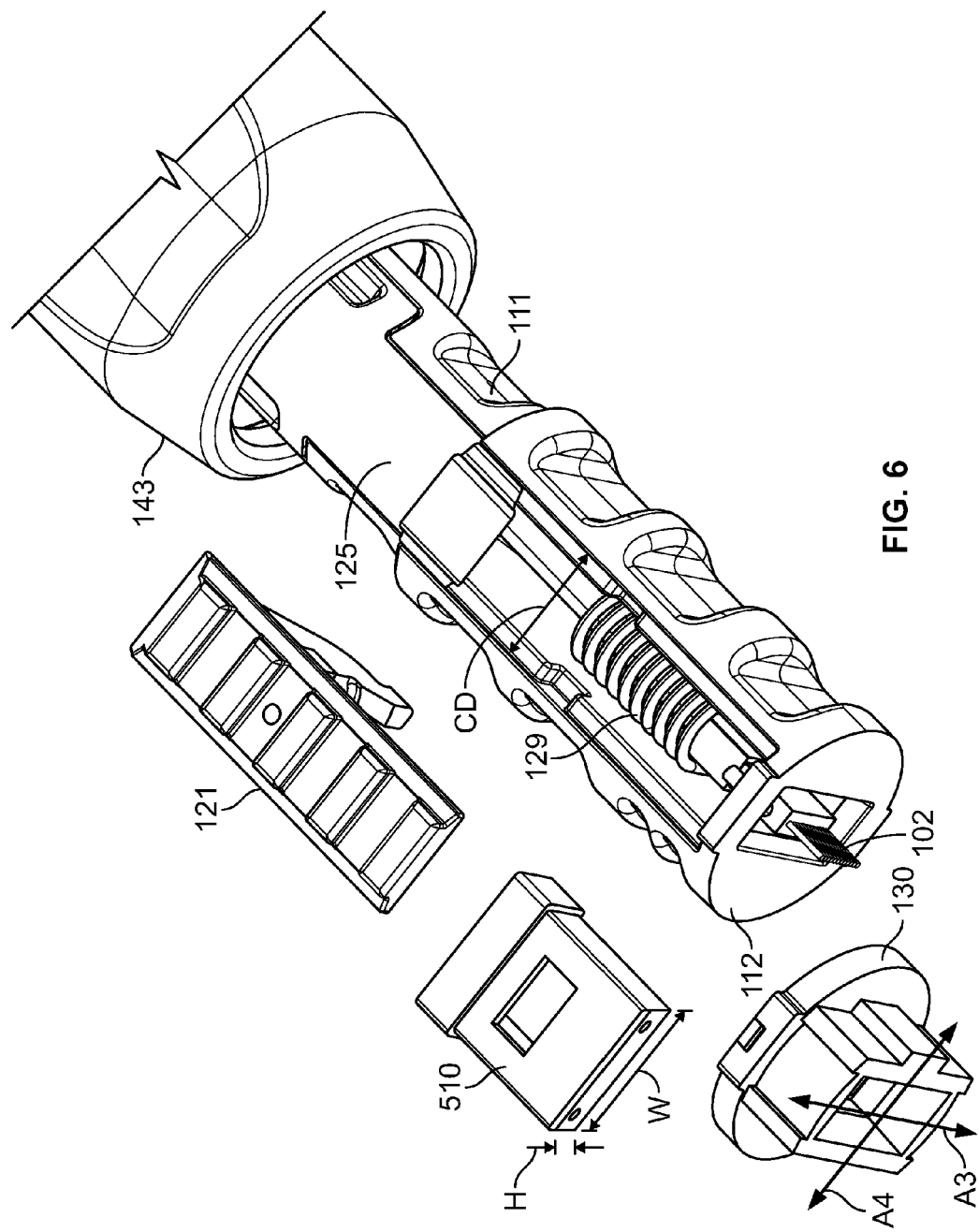
FIG. 6 is a perspective view of a portion of the example hardened connector arrangement of FIG. 3 including the connector of FIG. 4 with a portion of the cover exploded to reveal part of the interior of the connector body, a front end piece exploded forwardly of the connector body to reveal optical fiber portions, and the multi-fiber ferrule exploded outwardly and rotated 90°.

FIGS. 4-6 show one example implementation of a fiber optic connector 110 suitable for terminating a multi-fiber cable, such as cable 105 shown in FIG. 2. The fiber optic connector 110 includes a connector body 111, a multi-fiber ferrule 510 that mounts at a front end 112 of the connector body 111, and a cover 128. The connector body 111 has a length L (FIG. 4) that extends along an axis of the connector body 111. A fiber strain relief boot 508 (FIG. 7) mounts at a back side of the ferrule 510. The connector body 111 includes front and rear ends 112, 113 separated by the length L of the connector body 111. The connector body 111 has a forward section 114 and a rearward section 115. The forward section 114 defines an interior 116 in which a rear portion of the multi-fiber ferrule 510 is disposed. A spring (e.g., a coil spring) 129 also is disposed in the connector interior 116. The spring 129 biases the multi-fiber ferrule 510 in a forward direction through the first end 112 of the connector body 111.

The rearward portion 115 defines at least one strength component chamber 117 (see FIG. 5) and a fiber passage 118. In certain implementations, the rearward portion 115 defines two strength component chambers 117 (e.g., grooves, slots, receptacles). In such implementations, the fiber passage 118 passes in between the strength component chambers 117. In certain implementations, the inner walls 500 of the connector body 111 taper inwardly from the forward interior 116 to the fiber passage 118 to accommodate the strength component chambers 117 (see FIG. 5). In certain implementations, two fingers 119 extend rearwardly from a rear plate 113 of the connector body 111. Each finger 119 includes inwardly directed teeth adapted to grip/bite into the cable jacket 107 when the cable 105 is attached to the connector 110.

The multi-fiber ferrule 510 is configured to receive polished ends of multiple optical fiber portions 102 (see FIG. 6). The multi-fiber ferrule 510 defines a major axis A3 and a minor axis A4 (FIGS. 4 and 5). The major and minor axes A3, A4 of the multi-fiber ferrule 510 are generally perpendicular relative to one another. The major axis A3 of the multi-fiber ferrule 510 is generally perpendicular to the major axis A1 of the jacket 107 of the fiber optic cable 105 and the minor axis A4 of the multi-fiber ferrule is generally perpendicular to the minor axis A2 of the jacket 107 of the fiber optic cable 105 (see FIG. 13). The multi-fiber ferrule 510 has a width W and a height H (FIG. 6). The multi-fiber ferrule 510 supports ends of a plurality of optical fiber portions 102 in openings 101 aligned along a line (e.g., axis A3) that extends along the width of the multi-fiber ferrule 510.

Figure 13:
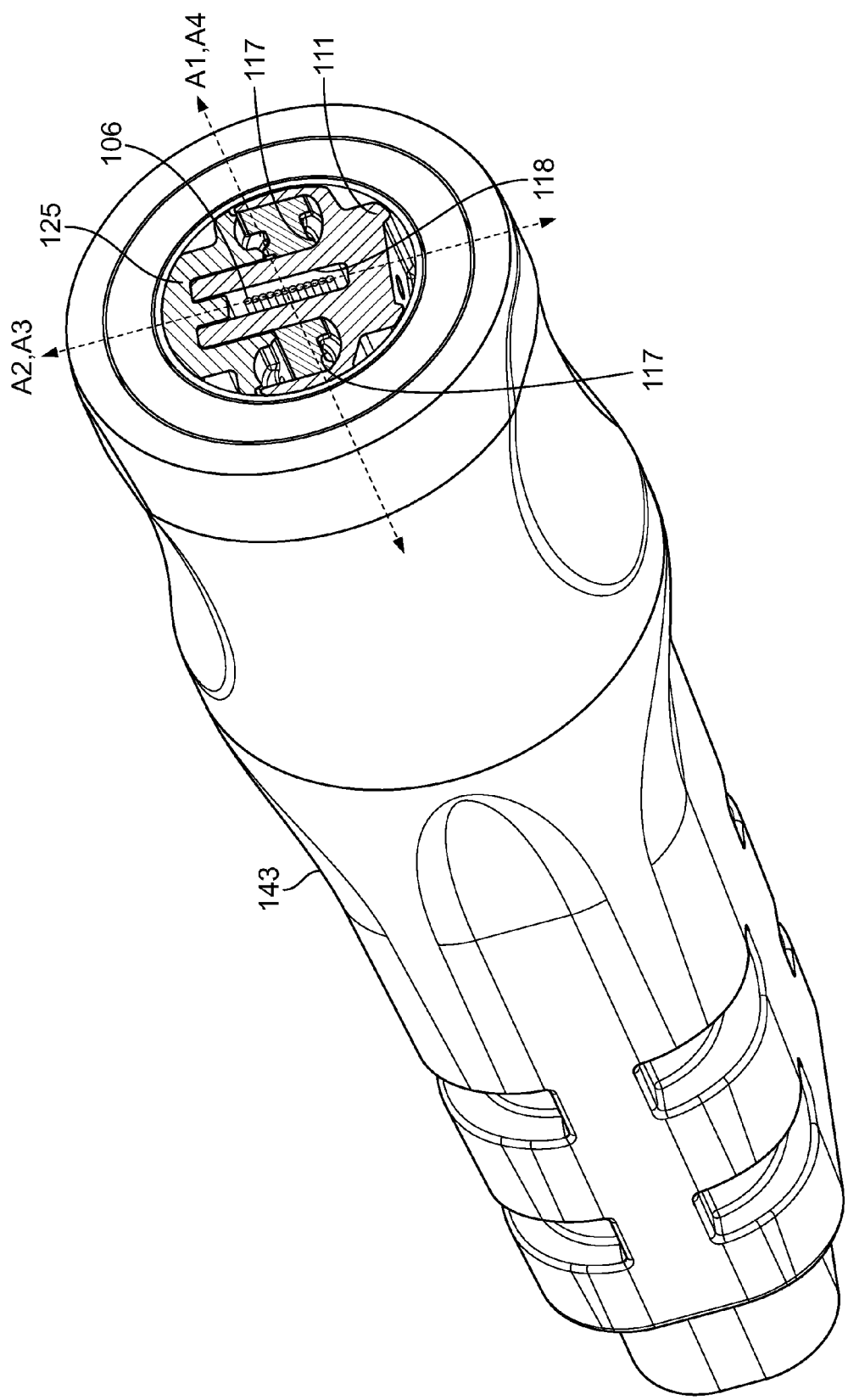
FIG. 13 is a perspective view of a lateral cross-section of the example hardened connector arrangement of FIG. 1 taken along the 13-13 line of FIG. 1.
Figure 13A:
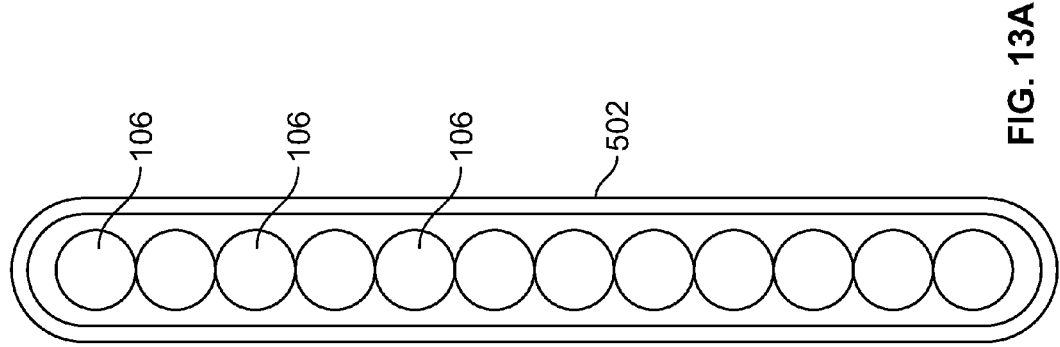
FIG. 13A is a front elevational view of ribbonized fibers recoated in a matrix material.

When the connector 110 is fully assembled, the optical fiber portions 102 extend at least partially through the connector body 111. In some implementations, the optical fiber portions 102 are integral with the optical fibers 106 of the fiber optic cable 105. In such implementations, the fibers 106 of the fiber optic cable 105 extend through the fiber passage 118 of the connector body 111 and through the forward interior 116 of the connector body 111. The multi-fiber ferrule 510 is mounted directly on the optical fibers 106 of the fiber optic cable 105 without any intermediate splice. In certain implementations, the optical fibers 106 within the fiber optic cable 105 are ribbonized or loose. In some implementations, the fiber passage 118 is elongated along the minor axis A2 of the fiber optic cable 105 and ribbonized optical fibers are routed therethrough with the major axis of the ribbon aligned with a major axis of the fiber passage 118 (see FIG. 13). In FIG. 13, the matrix material binding the fibers in a row is not visible. In FIG. 13A, matrix material 502 is schematically shown bonding the fibers 106 together to form the ribbon.

In other implementations, the optical fiber portions 102 are spliced to the optical fibers 106 of the fiber optic cable 105 at a splice location 103 within the connector body 111. In certain implementations, the optical fiber portions 102 are fusion spliced to the optical fibers 106 of the fiber optic cable 105, and the splices are mechanically reinforced using a re-coat process. In certain implementations, the optical fiber portions 102 are ribbonized. Ribbonized fibers 106 of the fiber optic cable 105 extend at least partially through the passage 118 towards the connector interior 116. The ribbonized fiber portions 102 are spliced to the ribbonized fibers 106 at the splice location 103. For example, the fibers 106 and fiber portions 102 may be fusion spliced. In certain implementations, the splice location 103 is reinforced and protected by a re-coating layer of additional binder or matrix material applied around the splice location 103.

In certain implementations, additional splice protection can be used to protect the re-coated splice section. In some implementations, a thin plate 430 may be disposed adjacent the ribbon and a heat shrink tube is wrapped and shrunk around the ribbon and the plate. In one example implementation, the plate 430 is formed of stainless steel, but may be formed from any desired material (e.g., tempered steel) in other implementations. The additional protection enhances the robustness of the splice section while maintaining a low profile. In other implementations, a glass strength member (e.g., having a half-round or rectangular cross section) is disposed adjacent the fibers instead of the plate. In other implementations, an adhesive layer is applied over the fibers of the splice section instead of recoating them.

Figure 16:
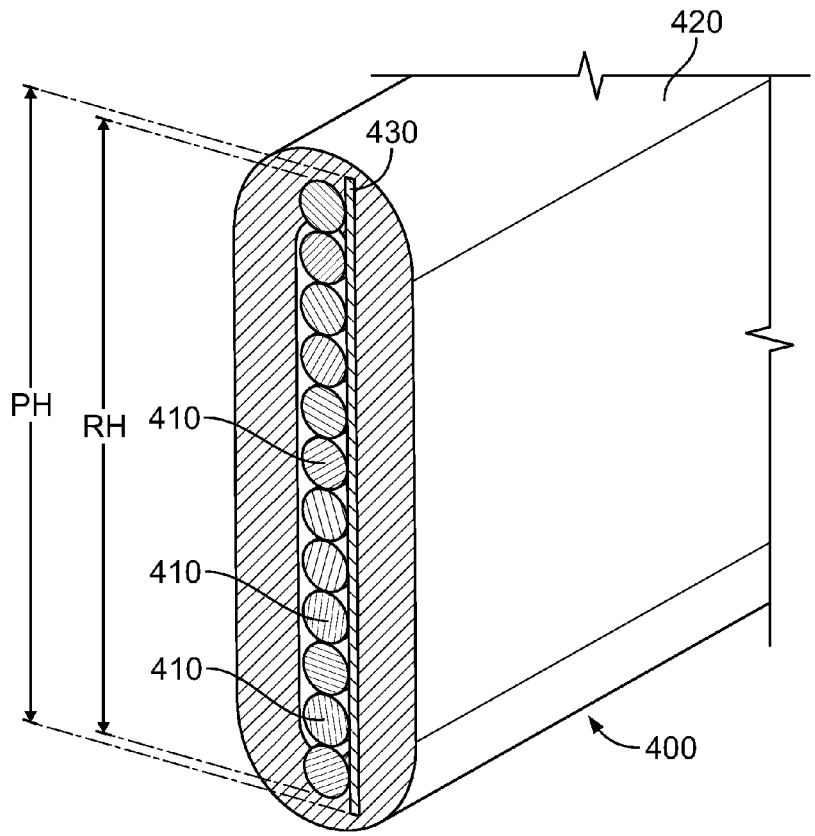
FIG. 16 is a perspective view of an enlarged section of an example optical cable 400, which has a plurality of optical fibers 410 formed in a ribbon and a protection plate, suitable for use in the of fiber optic cable assemblies disclosed herein.
Figure 17:
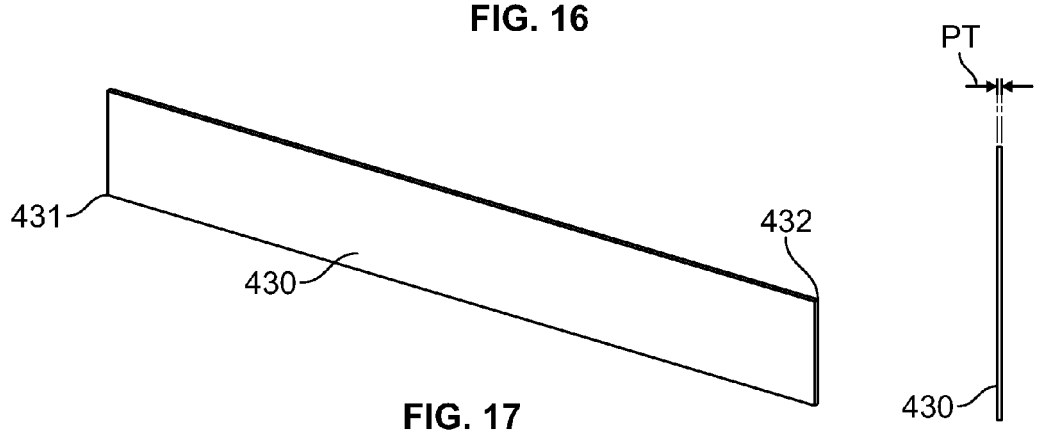
FIGS. 17-19 are various views of an example protection plate suitable for use in the cable shown in FIG. 16.
Figure 18:
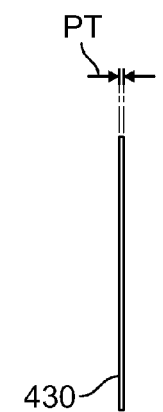

For example, FIG. 16 shows an enlarged view of a section of an example optical cable 400 having a plurality of optical fibers 410 formed in a ribbon. A plate 430 is disposed at the ribbon to extend across each of the fibers 410 and along part of the length of the fibers 410. A heat shrink tube 420 is wrapped around both the optical fibers 410 and the plate 430. As shown in FIG. 17, the plate 430 includes a generally planar (i.e., flat) plate. In some implementations, the plate 430 is generally rectangular. In certain implementations, the plate 430 has no flanges extending outwardly from a rectangular perimeter of the plate 430. In certain implementations, the plate 430 is generally flexible. For example, in certain implementations, the plate 430 includes no edge reinforcements or stiffening elements. In certain implementations, the plate 430 has uniform flexibility. In some implementations, the plate 430 has a constant transverse cross-section (see FIG. 18) extending from one end 431 of the plate 430 to an opposite end 432 of the plate 430. In one example implementation, the plate 430 has a rectangular transverse cross-section (see FIG. 18)

Figure 19:
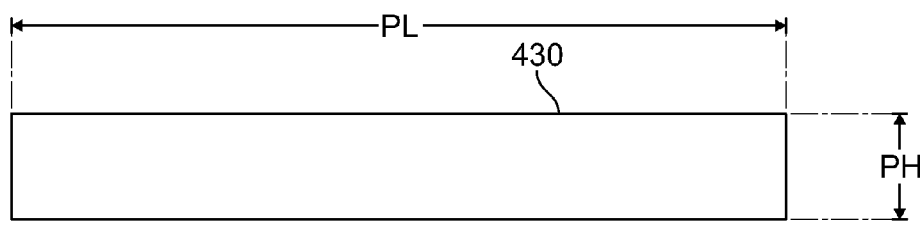

In some implementations, the plate 430 has a thickness PT that is no greater than about 0.01 inches along the length PL of the plate 430. In certain implementations, the plate 430 has a thickness PT that is no greater than about 0.005 inches along the length PL of the plate 430. In one example implementation, the plate 430 has a constant thickness PT (FIG. 18) of about 0.002 inches. In other implementations, however, the plate 430 may have any desired thickness. In one example implementation, the plate 430 has a height PH (FIG. 19) that is slightly greater than a height RH (FIG. 16) of the re-coated ribbon (see FIG. 16), but in other implementations may have the same height or a smaller height. In one example implementation, the plate 430 has a length PL (FIG. 19) that is slightly greater than a length of the re-coated ribbon, but in other implementations may have the same length or a smaller length. In certain implementations, the plate 430 has a height PH that is no greater than about 0.15 inches and a length PL that is no greater than about 1.2 inches. In certain implementations, the plate 430 has a height PH that is no greater than about 0.13 inches and a length PL that is no greater than about 1 inch. In one example implementations, the plate 430 has a height PH of about 0.12 inches and a length PL of about 0.925 inches.

The connector body 111 also defines a side opening 120 (FIG. 5) that extends along at least part of the length L of the connector body 111. The side opening 120 is arranged and configured to allow the multi-fiber ferrule 510 to be inserted laterally into the connector body 111 through the side opening 120. In certain implementations, the side opening 120 is arranged and configured to allow the multi-fiber ferrule 510 and the optical fiber portions 102 to be inserted laterally into the connector body 111 through the side opening 120. In certain implementations, the side opening 120 is arranged and configured to allow the multi-fiber ferrule 510, the optical fiber portions 102, and the optical fibers 106 to be inserted laterally into the connector body 111 through the side opening 120. In this way, the optical fibers need not be axially threaded through an opening during the loading process.

The cover 128 mounts over the side opening 120 after the multi-fiber ferrule 510 has been inserted into the connector body 111 through the side opening 120. In some implementations, the side opening 120 extends along the length L of the connector body 111 for at least fifty percent of the length L of the connector body 111. Indeed, in some implementations, the side opening 120 extends along the length L of the connector body 111 for at least 75 percent of the length L of the connector body 111. In the example shown, the lateral access is provided along the length L of the connector body 111 from directly behind a front end plate 506 at the front end 112 to the rear end 113 of the connector body 111.

In some implementations, the cover 128 includes a first cover section 121 and a second cover section 125. The first cover section 121 defines a retention surface 124 that is sized and shaped to be covered by a retaining surface 126 of the second cover section 125. In the example shown, the first cover section 121 is disposed over a front portion of the side opening 120 and the second cover section 121 is disposed over a rear portion of the side opening 120. In other implementations, the cover 128 is an integral piece. In some implementations, the cover 128 cooperates with the connector body 111 to define one or more of the strength component chambers 117. In the example shown in FIG. 13, the cover 128 cooperates with the connector body 111 to define two strength component chambers 117 as will be described in more detail herein.

The cover 128 includes a spring compression member 122 that axially compresses the spring 129 within the connector body 111 when the cover 128 is mounted to the connector body 111. In some implementations, the spring compression member 122 extends inwardly from the first cover section 121. In certain implementations, the spring compression member 122 includes an arm 122 that is sized and configured to extend laterally across the connector interior 116 when the cover 128 is coupled to the connector body 111. In the example shown, the spring compression member 122 includes two arms 122 (FIG. 3) extending laterally from the first cover section 121. In certain implementations, the arms 122 are sized to extend laterally across the connector interior 116 from the cover 128 to a radially opposite side of the connector body 111. In the example shown in FIG. 7, the arm 122 includes a distal tip 123 (FIGS. 10 and 11) that fits into a slot or recess defined in the radially opposite side of the connector body 111.

FIG. 6 is a perspective view of the connector 110 with the first cover section 121 exploded from the body 111 to reveal part of the forward interior 116. A front end piece 130 is exploded forwardly of the front end of the connector body 111 to reveal the opening through the front end plate 112. Optical fiber portions 102 extend through the opening. The multi-fiber ferrule 510 also has been exploded from the connector body 111 and rotated 90° for ease in comparing the ferrule 510 to the connector body 111. The side opening 120 in the connector body 111 has a maximum cross-dimension CD that is smaller than a width W of the multi-fiber ferrule 510. When assembled, the ferrule 510 is oriented so that the width W extends along a major axis (e.g., see axis A3) of the front end piece 130.

Figure 7:
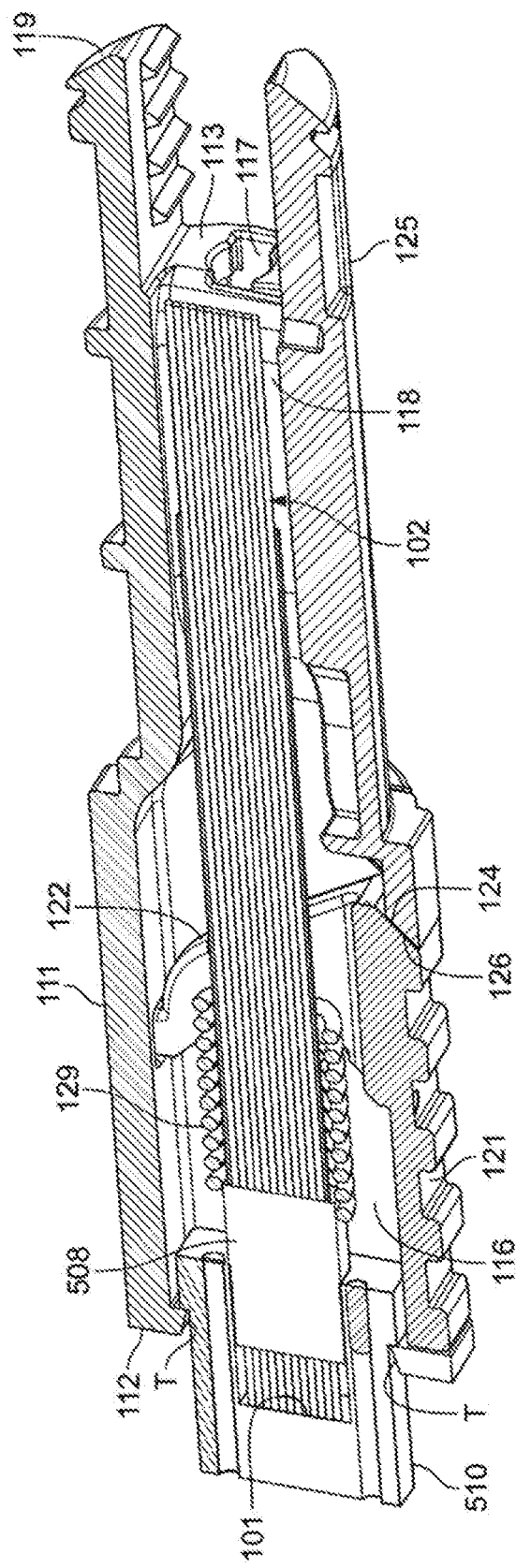
FIG. 7 is an axial cross-sectional view of the connector of FIG. 4.
Figure 8:
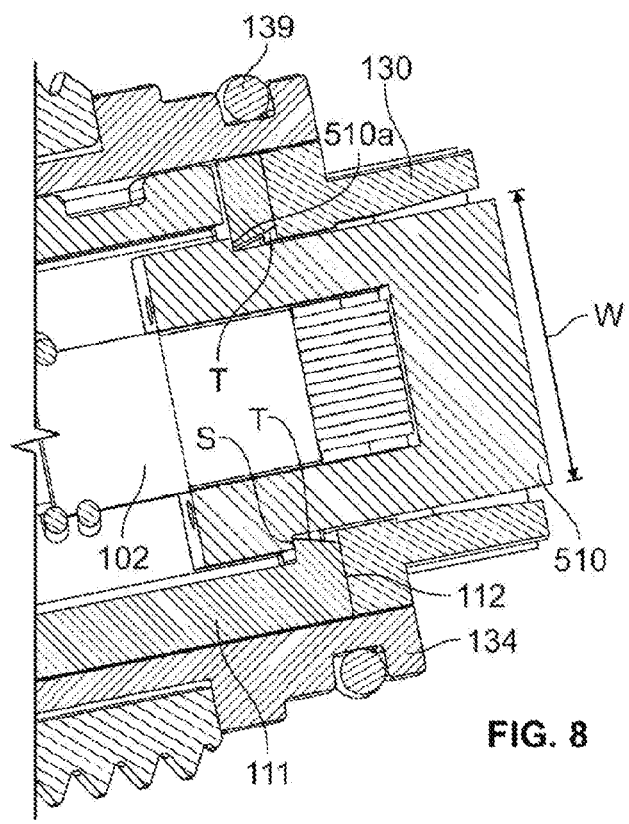
FIG. 8 is an enlarged view of a cross-section of the example hardened connector arrangement of FIG. 1 showing the ferrule extending outwardly through the connector body.
Figure 9:
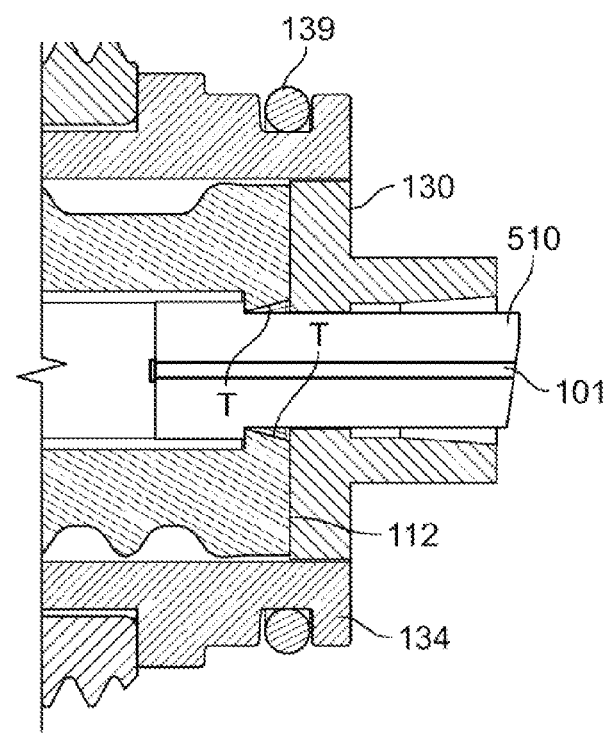
FIG. 9 shows the view of the example hardened connector arrangement of FIG. 8 rotated 90°.

FIGS. 7-9 show the multi-fiber ferrule 510 extending through the through-opening in the front end plate 506 of the connector body 111. In certain implementations, the through-opening has a generally rectangular shape having opposing major sides and opposing minor sides. The ferrule 510 defines rear shoulders 510a (FIG. 8) that are sized and shaped to abut interior shoulders S at the minor sides of the front plate 506 to inhibit removal of the ferrule 510 from the body 111 (see FIG. 8). The ferrule 510 is installed in the connector body 111 by sliding the ferrule 510 laterally through the side opening 120 of the connector body 111 and sliding the ferrule 510 forwardly through the through-opening in the front plate 506.

In some implementations, the through-opening in the front plate 506 is defined by one or more tapered walls T (see FIGS. 8 and 9). Such tapering may facilitate installation of the ferrule 510 in the connector body 111. In certain implementations, the through-opening has a transverse cross-sectional area that increases as the through-opening extends along the axis of the connector body 111 in a forward direction. In certain implementations, the major sides of the through-opening diverge from one another as the major sides extend in a forward direction. In certain implementations, the minor sides of the through-opening also diverge from one another as the major sides extend in a forward direction. In certain implementations, the major and minor sides are planar and are angled at oblique angles relative to the axis of the connector body 111.

In some implementations, the rear section 115 of the connector body 111 is configured to receive and retain at least one strength component 170 of a fiber optic cable 105. In certain implementations, the rear end 115 of the connector body 111 is configured to receive and retain at least two strength components 170 of the fiber optic cable 105. Strength components 170 of the fiber optic cable 105 are anchored relative to the fiber optic connector 111. For example, in certain implementations, the rear section 115 of the connector body 111 defines one or more chambers 117 in which the strength components 170 may be disposed. In certain implementations, adhesive (e.g., epoxy) may be applied to retain the strength components 170 in the chambers 117. In certain implementations, the chambers 117 may include inwardly directed teeth or other retention structures to aid in anchoring the strength components 170 within the chambers 117.

Figure 10:
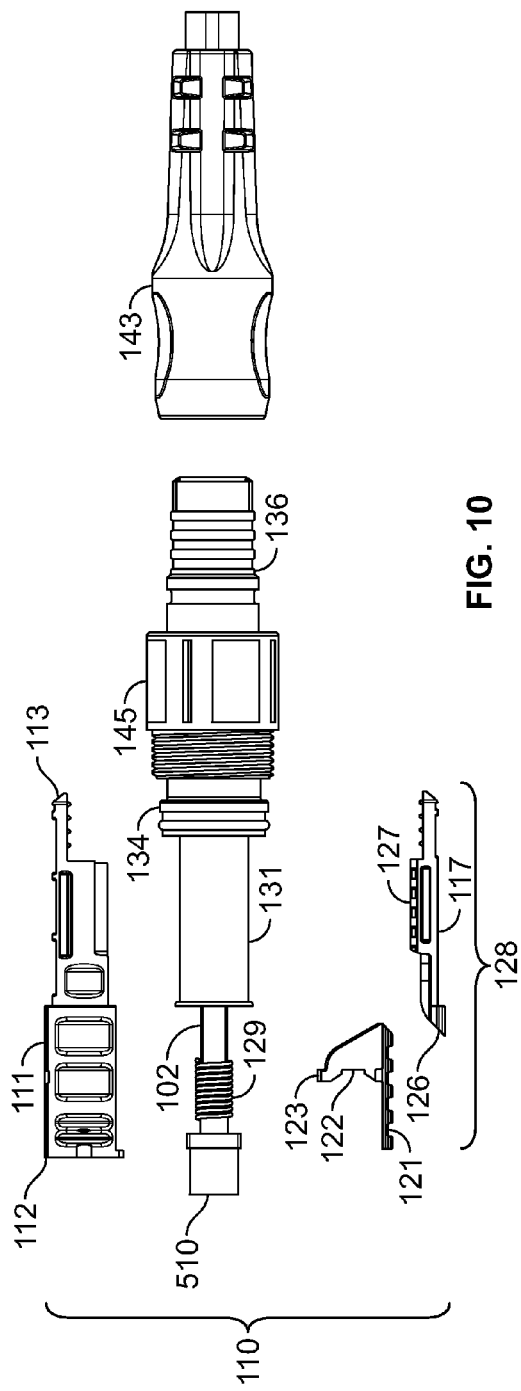
FIG. 10 is a bottom plan view of the example hardened connector arrangement of FIG. 3 with various components exploded outwardly including the connector body, the cover, and the strain-relief boot.
Figure 11:
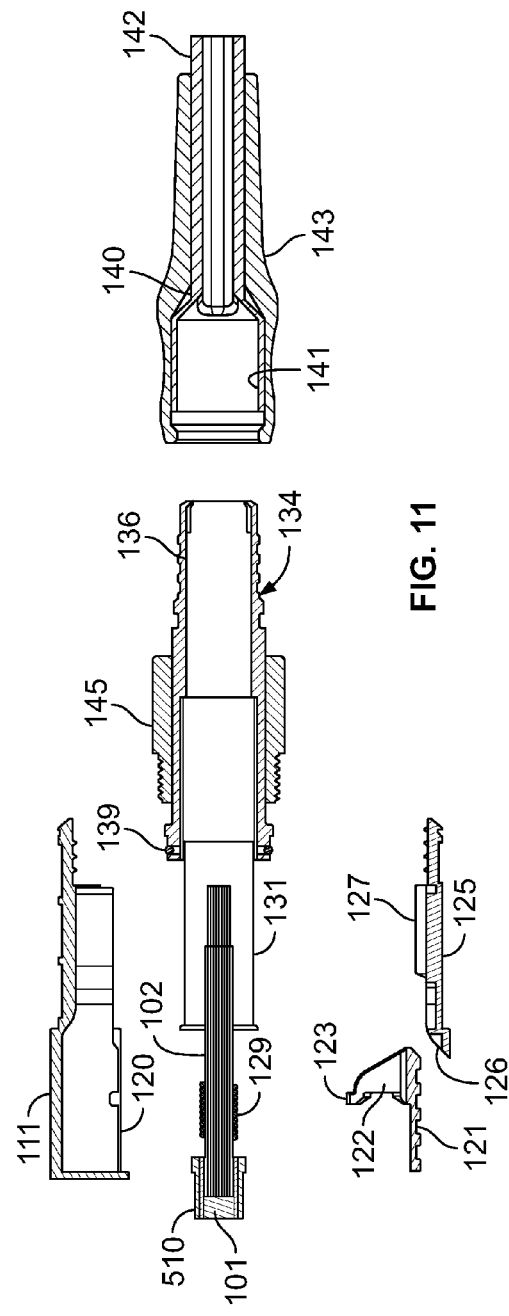
FIG. 11 is an axial cross-sectional view of the example hardened connector arrangement shown in FIG. 10.

In some implementations, the connector body 111 forms a first portion of each component chamber 117 and the cover 128 (e.g., the second portion 125 of the cover 128) forms a second portion 127 of each component chamber 117 (see FIGS. 10 and 11). When the connector 110 is assembled, the cover 128 is removed to reveal the side opening 120. The fiber portions 102 are disposed in the ferrule 510. If necessary, the fiber portions 102 are spliced to exposed ends of the cable fibers 106. The connector body 111 is installed on the cable 105 (e.g., over the splice location 103) by sliding the cable 105 through the side opening 120 so that the cable fibers 106 slide into fiber passage 118 and strength components 170 slide into the first portions of the component chambers 117. The cover 128 is mounted to the connector body 111 to close the side opening 120 and to close the chambers 117. The arms 122 of the cover 128 compress the spring 129 when the cover 128 is mounted to the connector body 111. Adhesive may be added to the chambers 117 during the installation process.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

The invention claimed is:

1. A fiber optic ruggedized connector comprising:
a connector body having a front end and a back end;
an environmental seal positioned about the connector body;
a ferrule positioned at least partially within the connector body adjacent the front end of the connector body, the ferrule supporting at least one optical fiber, the at least one optical fiber including a first portion secured within the ferrule and a second portion that extends rearwardly from the ferrule;
a spring that biases the ferrule in a forward direction, the spring having a forward end and a rearward end;

a fastener that mounts over the connector body, the fastener configured to rotate at least partially relative to the connector body, the fastener being configured to couple the fiber optic ruggedized connector to a ruggedized fiber optic adapter or another fiber optic ruggedized connector; and an optical splice location positioned within the connector.

2. The fiber optic ruggedized connector of claim 1, wherein the ferrule comprises a multi-fiber ferrule, and wherein end portions of a plurality of optical fibers are secured within the multi-fiber ferrule.

3. The fiber optic ruggedized connector of claim 2, wherein the end portions of the plurality of optical fibers are spliced to optical fibers of a fiber optic cable at the optical splice location.

4. The fiber optic ruggedized connector of claim 1, wherein the fastener is a threaded fastener.

5. The fiber optic ruggedized connector of claim 1, further comprising a boot positioned adjacent the back end of the connector body.

6. The fiber optic ruggedized connector of claim 1, wherein the connector body has a length that extends along an axis of the connector body between the front and back ends, the connector body defining a side opening that extends along the length of the connector body.

7. The fiber optic ruggedized connector of claim 6, further comprising a cover that mounts over the side opening after the ferrule has been inserted into the connector body through the side opening.

8. The fiber optic ruggedized connector of claim 7, wherein the cover includes a spring compression member that axially compresses the spring within the connector body when the cover is mounted to the connector body.

9. The fiber optic ruggedized connector of claim 1, wherein the back end of the connector body is configured to receive and retain at least one strength member of a fiber optic cable.

10. The fiber optic ruggedized connector of claim 1, wherein the at least one strength member of the fiber optic cable is secured within a rear portion of the connector body.

11. The fiber optic ruggedized connector of claim 6, wherein the front end of the connector body is defined by a front end plate, wherein the front end plate defines a through-opening through which a portion of the ferrule extends.

12. The fiber optic ruggedized connector of claim 11, wherein lateral access is provided along the length of the connector body from directly behind the front end plate to the back end of the connector body.

13. The fiber optic ruggedized connector of claim 6, wherein the side opening extends along the length of the connector body for at least 50 percent of the length of the connector body.

14. The fiber optic ruggedized connector of claim 6, wherein the side opening extends along the length of the connector body for at least 75 percent of the length of the connector body.

15. The fiber optic ruggedized connector of claim 1, further comprising a metal reinforcing sleeve that mounts over a rear portion of the connector body.

16. The fiber optic ruggedized connector of claim 15, further comprising an outermost sleeve that mounts over the metal reinforcing sleeve, the connector body and the outermost sleeve having a molded plastic construction.

17. The fiber optic ruggedized connector of claim 7, wherein the metal reinforcing sleeve includes a main sleeve body and a lip that projects radially outwardly from the main sleeve body, wherein the lip has a rearwardly facing surface, and wherein the outermost sleeve includes an internal shoulder having a forwardly facing surface that abuts the rearwardly facing surface of the lip to limit rearward movement of the reinforcing sleeve relative to the outermost sleeve.

18. A fiber optic ruggedized connector comprising:
a connector body having a length that extends along an axis of the connector body, the connector body including a front end and a back end separated by the length of the connector body, the connector body defining a side opening that extends along the length of the connector body;

an environmental seal positioned about the connector body;

a ferrule positioned at least partially within the connector body adjacent the front end of the connector body, the ferrule supporting at least one optical fiber;

a cover that mounts over the side opening after the ferrule has been inserted into the connector body through the side opening;

a fastener that mounts over the connector body, the fastener configured to rotate at least partially relative to the connector body, the fastener being configured to couple the fiber optic ruggedized connector to a ruggedized fiber optic adapter or another fiber optic ruggedized connector; and an optical splice location positioned within the connector body.

\* \* \* \* \*

UNITED STATES PATENT AND TRADEMARK OFFICE
CERTIFICATE OF CORRECTION

PATENT NO. : 9,864,151 B2
APPLICATION NO. : 15/209282
DATED : January 9, 2018
INVENTOR(S) : Lu Page 1 of 1

It is certified that error appears in the above-identified patent and that said Letters Patent is hereby corrected as shown below:

In the Claims

Column 11, Line 38, Claim 10: "connector of claim 1," should read --connector of claim 9,--

Column 12, Line 17, Claim 17: "connector of claim 7," should read --connector of claim 16,--

Signed and Sealed this
Fourteenth Day of May, 2019

Andrei Iancu
*Director of the United States Patent and Trademark Office*